(12) United States Patent
Resnick

(10) Patent No.: US 6,845,420 B2
(45) Date of Patent: Jan. 18, 2005

(54) SYSTEM FOR SUPPORTING BOTH SERIAL AND PARALLEL STORAGE DEVICES ON A CONNECTOR

(75) Inventor: Russell Alan Resnick, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 495 days.

(21) Appl. No.: 09/975,658

(22) Filed: Oct. 11, 2001

(65) Prior Publication Data

US 2003/0074515 A1 Apr. 17, 2003

(51) Int. Cl.⁷ .............................................. G06F 13/00
(52) U.S. Cl. ...................................... 710/303; 710/305
(58) Field of Search ........................... 710/74, 303, 71, 710/305, 304

(56) References Cited

U.S. PATENT DOCUMENTS 5,442,800 A * 8/1995 Okamura .................... 712/38
6,311,014 B1 * 10/2001 Nguyen et al. .............. 386/125
6,792,494 B2 * 9/2004 Bennett et al. .............. 710/302
2003/0005231 A1 * 1/2003 Ooi et al. ................... 711/131

* cited by examiner

*Primary Examiner*—Glenn A. Auve
*Assistant Examiner*—Nimesh G Patel
(74) *Attorney, Agent, or Firm*—Martin J. McKinley; Dillon & Yudell LLP

(57) ABSTRACT

A method and system that permit a modular computer and a data storage device to interface through common pins whether the data storage device is a parallel or serial device. The serial data lines and some of the parallel data lines from the computer are routed through a switching circuit to common pins at the interface, which is attached to the data storage device. If data from the computer is sent in parallel form through parallel data lines to a parallel storage device, most of the parallel data lines are connected to dedicated parallel pin connectors, while the remainder of the parallel data lines are routed through the switching circuit to common interface pins. If the storage device is a serial device, the switching circuit sends the serial data from the computer to the serial data storage device via the common interface pins.

14 Claims, 2 Drawing Sheets

SYSTEM FOR SUPPORTING BOTH SERIAL AND PARALLEL STORAGE DEVICES ON A CONNECTOR

BACKGROUND OF THE INVENTION

1. Technical Field

The present invention relates in general to the field of computers, and, in particular, to the connection of an external data storage device to a computer. Still more particularly, the present invention relates to an improved system for allowing a computer to share common interface pins to connect the computer to either a serial data interfacing external data storage device or a parallel data interfacing external data storage device.

2. Description of the Related Art

Historically, computers have typically connected to an external data storage device, such as a magnetic storage hard disk or an optical drive such as a Compact Disc-Read Only Memory (CD-ROM), via a parallel interface bus. The most popular bus for this parallel interface is the Advanced Technology (AT) Attachment/Integrated Drive Electronics (ATA/IDE) parallel bus, which is used to connect external data storage devices that have an integrated controller to control the transfer of data from the computer to the external data storage device.

More recent computers may have both parallel and serial data interfaces to external data storage devices, and in the future are expected to have only serial data interfaces. To provide appropriate electrical and mechanical interfacing, separate pin connectors are required for parallel and serial connections. These additional pins for accommodating different interfaces are expensive, especially when competing for space in smaller laptop and palmtop computers, as well as in a docking station for such computers. Further, additional pins may be required to signal from the external data storage device to the computer whether the external data storage device can receive data in the form of parallel, serial or both.

It should therefore be apparent that there exists a need for a method and apparatus that provides an electrical interface between the computer and the external data storage device that allows the use of common interface pins in the interface between the computer and the external data storage device whether the external data storage device communicates via serial or parallel data lines. Such shared usage of computer/device interface pins would allow not only conservation of pins, but would also allow computers that use external data storage devices in parallel only, parallel or serial, or serial only form to use the same docking station and/or storage device interface.

SUMMARY OF THE INVENTION

The present invention in its preferred embodiment is a method and system that permit an interface between a modular or mobile computer and an external serial data storage device to re-use some of the same pins that were previously available to connect the computer to an external parallel data storage device. Data storage devices having a parallel interface for communicating data are herein referred to as "parallel data storage devices," and those having a serial interface for communicating data are herein referred to as "serial data storage devices." The serial data lines and some of the parallel data lines from the computer are routed through a switching circuit to common shared pins at the computer interface, which is attachable to either a parallel or serial data storage device. If data from the computer is sent in parallel form to a parallel data storage device, most of the parallel data lines are connected to dedicated parallel pin connectors, while the remainder of the parallel data lines are routed through the switching circuit to common shared interface pins that may alternatively be used to connect to a serial data storage device. The parallel storage device is thus connected to both the dedicated pin connections plus the shared common interface pins. If the storage device is a serial device, a selector signal is sent to the switching circuit to send the serial data from the computer to the shared common interface pins, which then are connected to the serial device, which ignores the dedicated parallel pin connectors. The above, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
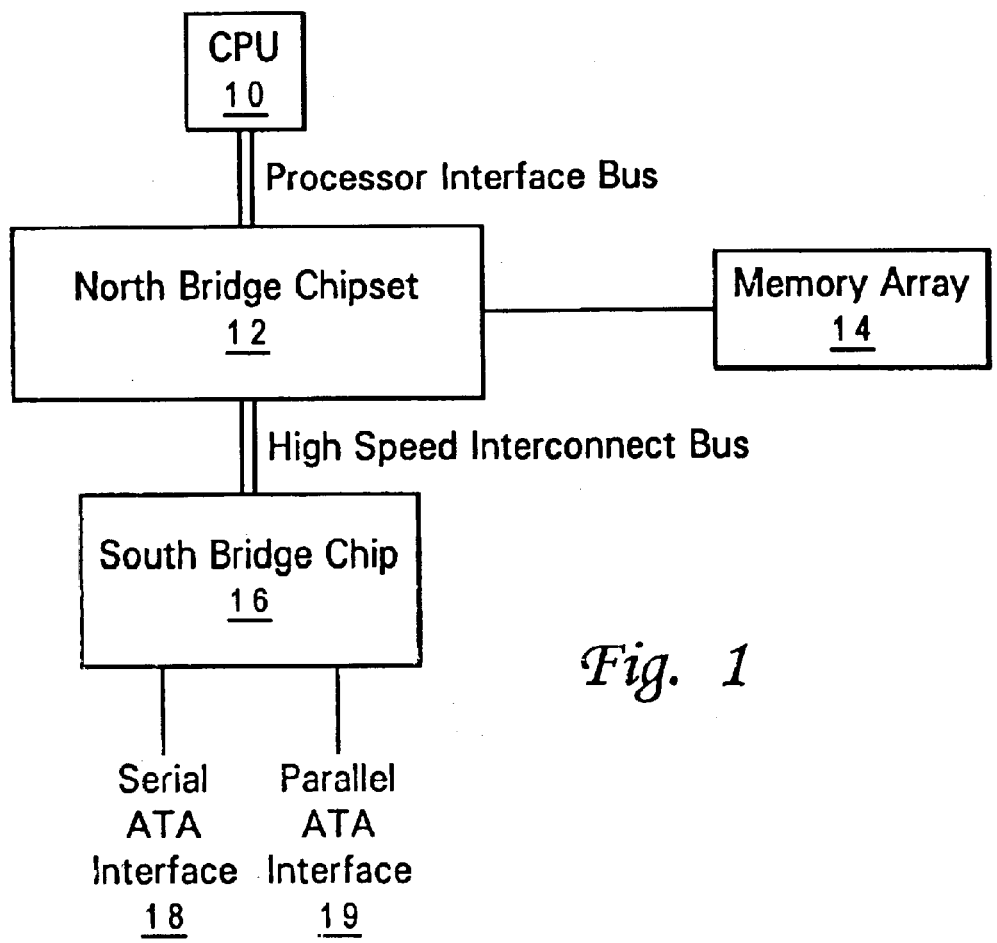
FIG. 1 depicts a block diagram of the architecture of a computer having a serial and/or parallel ATA interface for an external data storage device.

With reference now to the drawings and in particular to FIG. 1, there is depicted a block diagram of a computer, which includes a central processing complex (CPC) that includes a Central Processing Unit (CPU) 10, a memory array 14 and a memory and Input/Output (I/O) controller described below. The computer further has a serial and/or parallel AT Attachment (ATA) interface for an ATA/IDE data storage device (not shown), such as a magnetic storage device such as a hard disk, or an optical storage device such as a CD-ROM. CPU 10 connects via a processor interface bus (also referred to in the art as a front-side, host or system bus) to north bridge chipset 12, an arbiter logic circuit having a memory controller and a high speed interconnect bus source. North bridge chipset 12 includes the necessary interface electronics to strengthen signals from CPU 10, and to separate signals to and from memory array 14 from those going to and from Input/Output (I/O) devices (not shown).

Figure 2:
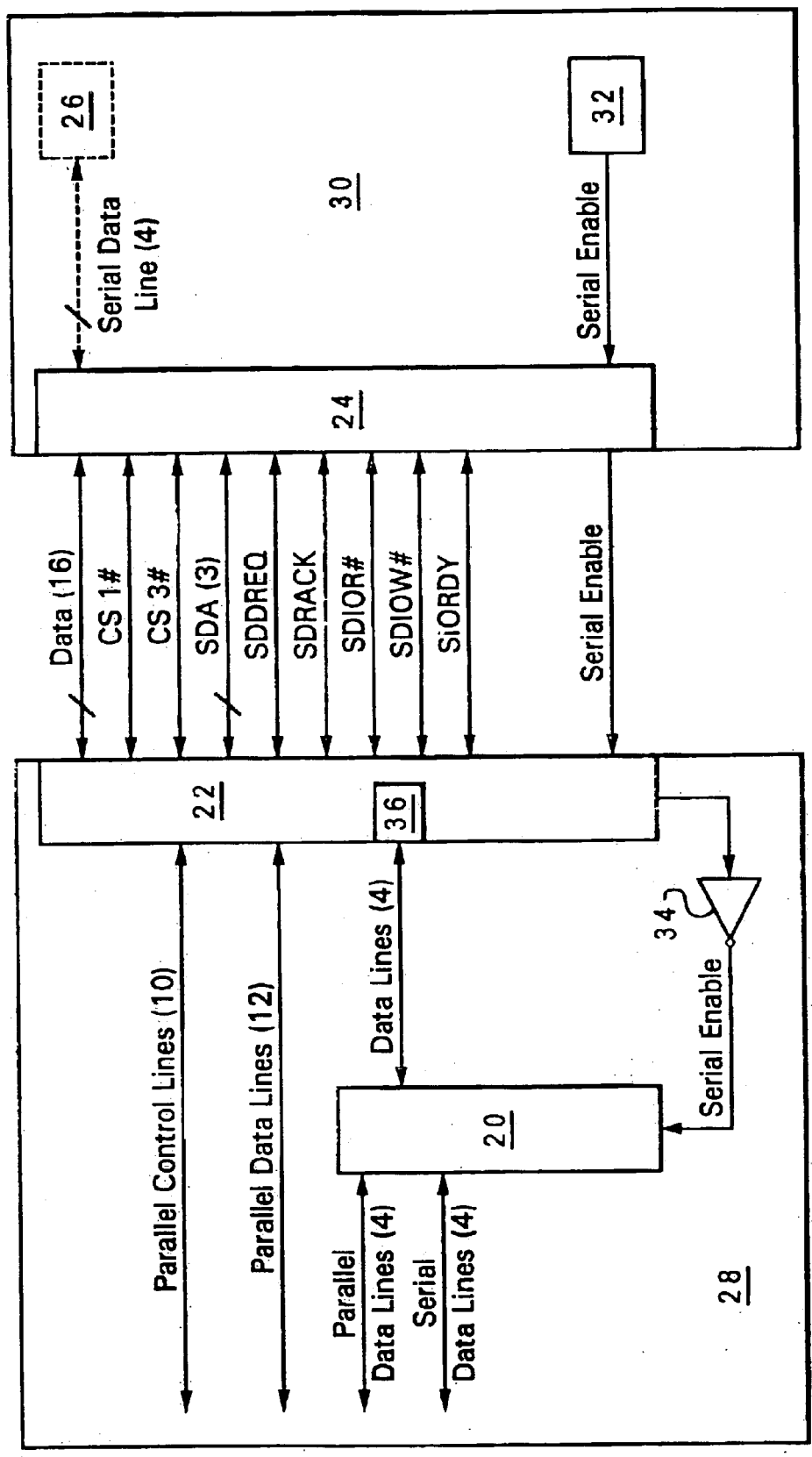
FIG. 2 illustrates an interface between a computer and a docking station using the present invention to select the serial or parallel mode for data communicated with the external data storage device.

North bridge chipset 12 is connected via a high speed interconnect bus, preferably a proprietary high speed bus but alternatively a Peripheral Component Interconnect (PCI) bus, to south bridge chipset 16, which is a CPU-I/O interface circuit that includes the necessary interface logic to convey signals from the high speed interconnect bus to (typically slower) I/O interfaces, including a serial ATA interface 18 and a parallel ATA interface 19. In a preferred embodiment, serial ATA interface 18 includes four serial data lines made up of two pairs of differential data lines, which also communicate control signals, and are connected via a switching circuit 20, preferably a multiplexer, to common interface pins 36, a subset of preferably four pins on parallel ATA computer interface 22, shown in FIG. 2 and FIG. 3. Parallel ATA interface 19 preferably includes ten parallel control lines plus sixteen parallel data lines. The sixteen parallel data lines include twelve lines connected to dedicated parallel interface pins on parallel ATA computer interface 22, while the remaining four parallel data lines connect via the switching circuit 20 to the same subset of four shared common pins described above and referenced as common interface pins 36.

Reference is again made to FIG. 2, which illustrates a block diagram of a preferred embodiment of the present invention being utilized between a laptop computer 28 and a docking station 30. In a preferred embodiment, parallel ATA computer interface 22 when operated in parallel mode for connection to an external parallel data storage device, includes the illustrated ten parallel control lines and sixteen parallel data line conductors (12 dedicated parallel lines plus 4 lines that may be alternatively used serially as described below). The ten parallel control lines preferably control the following functions/commands:

Chip Select (CS)—2 lines

Storage Data Address (SDA)—3 lines

Storage Data Dma (Direct memory access) REQuest (SDDREQ)

Storage Data Dma ACKnowlede (SDDACK)

Storage Data Input/Output Read number (SDIOR#)

Storage Data Input/Output Write number (SDIOW#)

Storage Input/Output ReaDY (SIORDY)

The twelve lines and four lines of parallel data lines combine to represent a word (two 8-bit bytes) of data, but are physically separated for reasons described herein. When laptop computer 28 communicates to an external parallel data storage device, sixteen parallel data lines are connected via parallel ATA computer interface 22 to a parallel ATA storage device interface 24. Twelve of the parallel data lines are connected via data line conductors to dedicated pins on parallel ATA computer interface 22 for interfacing with parallel ATA storage device interface 24. The remaining four parallel data lines are routed through bi-directional switching circuit 20 for connection to four common interface pins 36, which are a subset of the plurality of pins associated with parallel ATA computer interface 22. These four parallel data lines are routed through bi-directional switching circuit 20 when the external data storage device is a parallel storage device, as communicated by the absence of a serial enable signal to bi-directional switching circuit 20. The pins of ATA computer interface 22 are connected to a parallel ATA storage device interface 24, which interfaces an external parallel data storage device (not shown) either directly or through a docking station 30.

If the external data storage device uses a serial data line interface, and thus is referred to as an external serial data storage device, the interface between the external serial data storage device and laptop computer 28 is via serial ATA connector 26. Serial ATA connector 26 may be a buffer circuit connected to a select subset of the connectors in parallel ATA storage device interface 24 and associated with common interface pins 36 of parallel ATA computer interface 22, or serial ATA connector 26 may simply be the subset of connectors (pins) themselves coming off parallel ATA storage device interface 24 connected to common interface pins 36. For the serial data lines on the computer 28 side to be directed to common interface pins 36, a serial enable signal is sent from a serial enabler 32. Serial enabler 32 is preferably a data transfer mode selection circuit connected ultimately to switching circuit 20. Serial enabler has circuitry associated with the external serial data storage device (not shown), which generates the serial enable signal indicating to laptop computer 28 that the external data storage device is a serial data storage device. Alternatively, serial enabler 32 may be hardware, software or firmware associated with docking station 30 that generates the serial enable signal based on electrical or mechanical input from the storage device. The enable signal is preferably a logic high voltage signal, preferably near +5$V_{DC}$, transmitted from the external serial data storage device or its associated circuitry to bi-directional switching circuit 20 via a pin from parallel ATA storage device interface 24 to parallel ATA computer interface 22. The same four data lines that earlier were used to transmit parallel data are now used to transmit serial data, and thus these four data lines are multi-mode, parallel/serial data lines that selectively transfer parallel or serial data between a storage device (not shown) and computer 28.

Figure 3:
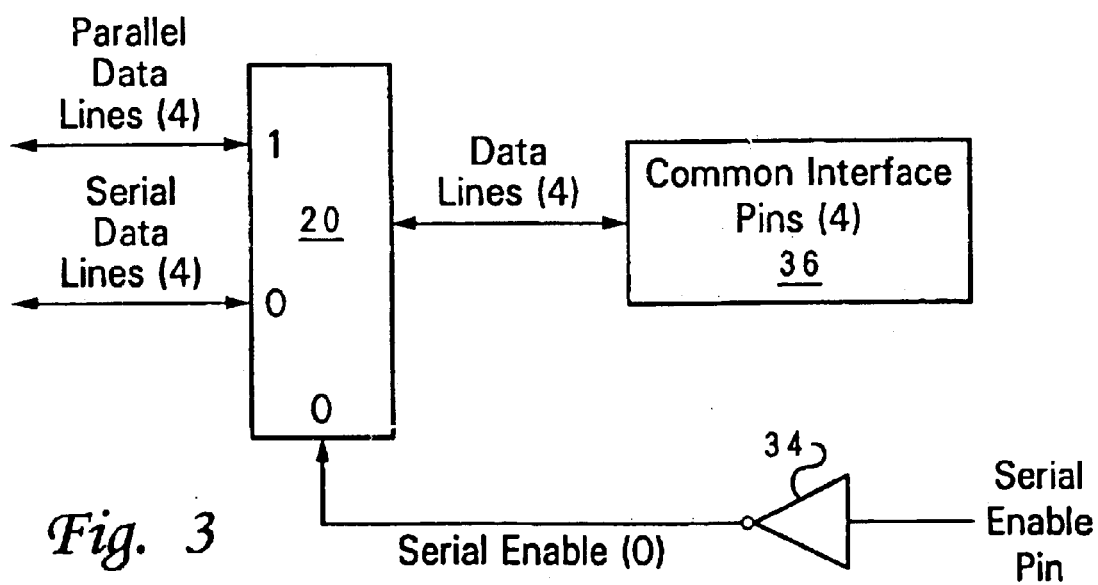
FIG. 3 depicts a switching circuit for directing serial or parallel data lines to a subset of shared common interface pins between the computer and the docking station.

As depicted in greater detail in FIG. 3, switching circuit 20 conveys the serial data input lines to common interface pins 36 only when the serial enable input signal received at switching circuit 20 is logically low (near zero voltage). Thus, a voltage pull-up, preferably using an inverter 34, keeps a logic high voltage signal on the serial enable pin of switching circuit 20 when the serial enable signal from an external serial data storage device is absent, such as when the external data storage device is a parallel storage device, or when laptop computer 28 is not plugged into docking station 30. When the serial enable pin receives a logic high voltage signal, the four parallel data lines are directed to the four output data lines from switching circuit 20, and these four parallel lines connect to the four shared common interface pins 36 of parallel ATA computer interface 22. The parallel ATA computer interface 22 is now in parallel mode for connecting to an external data storage device having a parallel interface, referred to herein as an external parallel data storage device. The serial enable pin is thus high by default when there is no serial enable signal from serial enabler 32, either because the storage device is a parallel device, or because the docking station and/or the storage device itself are not attached.

When serial enabler 32 sends a logic high voltage signal, indicating that the storage device that communicates via serial data lines, and herein referred to as an external serial data storage device, inverter 34 inverts the logic high voltage signal to a logic low voltage signal so that the serial enable pin on switching circuit 20 receives the logic low voltage signal, and thus directs the four serial data lines (two pairs of differential lines for sending and receiving data) to the output data lines from switching circuit 20. The output serial data lines from switching circuit 20 are attached to the same four shared common interface pins 36 in parallel ATA computer interface 22 used when laptop computer 28 was operating in parallel mode for connecting to a parallel storage device. These same pins share the same pin connections between parallel ATA computer interface 22 and parallel ATA storage device interface 24. Thus these same pins, or any equivalent conductors, make up a subset of the pins (or equivalent conductors) between parallel ATA computer interface 22 and parallel ATA storage device interface 24. Serial ATA connector 26, connected to or alternatively being the four pins on parallel ATA storage device interface 24 connected to the four common interface pins 36 of parallel ATA computer interface 22, connects the external serial data storage device via common interface pins 36 to laptop computer 28. The dedicated pins in parallel ATA computer interface 22 and parallel ATA storage device interface 24 that were used in parallel mode for the ten control lines and the dedicated twelve parallel data lines are typically ignored when the serial enable signal is high (and thus inverted to show a logic low voltage signal at switching circuit 20) and the interfaces are in serial mode as described. Alternatively, the ten control lines and remaining twelve parallel data lines may be used for alternative connections according to logic circuitry (not shown) installed for alternative and/or additional electronic purposes.

In a preferred embodiment, if an external data storage device is able to receive data in either serial or parallel form, a serial enable signal will be sent to laptop computer 28 as described above for an external serial data storage device.

While one additional pin in the computer/docking station interface preferably is dedicated to carrying the serial enable signal as described, alternatively software or circuitry known in the art may be used to permit the sharing by the serial enabler of an existing pin in the interface that is non-dedicated for the serial enabler. That is, a pin that was available for parallel data on control interfacing may be used by the serial enabler, since such pins are not needed in serial mode for a serial storage device. Even if the serial enable signal requires its own separate dedicated pin, the net savings to the interface by sharing four data pins in either serial or parallel mode is still three pins, which may be omitted from the interface to reduce size, or may be allocated to another device or function.

While the preferred embodiment is shown incorporated with laptop computer 28 interfacing docking station 30, it is understood that the present invention may also be utilized in the form of any computer, including a desktop computer, having preferably parallel ATA computer interface 22, wherein common shared pins may be used for either an external parallel data storage device or an external serial data storage device according to the apparatus and method described above. Further, while the invention has been particularly shown and described with reference to a preferred embodiment, it will be understood by those skilled in the art that various changes in form and detail may be made therein without departing from the spirit and scope of the invention.

What is claimed is:

1. An interface circuitry for connecting a data storage device to a computer, said interface circuitry comprising:
    a parallel data line for transferring parallel data between the data storage device and the computer;
    a multi-mode, parallel/serial data line for selectively transferring parallel or serial data between the data storage device and the computer;
    a switching circuit, connected to said parallel/serial data line, having first and second selectable modes of operation, said switching circuit being connectable to the computer; and
    a data transfer mode selection circuit connected to said switching circuit, said mode selection circuit for sending a parallel mode selection signal to said switching circuit for placing said switching circuit in said first mode of operation, wherein parallel data is transferable between the storage device and the computer over both the parallel data line and the parallel/serial data line, said mode selection circuit for sending a serial mode selection signal to said switching circuit for placing said switching circuit in said second mode of operation, wherein serial data is transferable between the storage device and the computer over said parallel serial data line, and wherein the interface circuitry is connected to a docking station.

2. The interface circuitry of claim 1, wherein the interface circuitry is electrically connected to an Advanced Technology Attachment/Integrated Drive Electronics (ATA/IDE) bus in the computer.

3. The interface circuitry of claim 2, wherein the data transfer mode selection circuit is electrically connected to the switching circuit through the ATA/IDE bus.

4. The interface circuitry of claim 1, wherein the data transfer mode selection circuit is electrically connected the switching circuit via conductor, oriented between the computer and the data storage device, that is non-dedicated to the data transfer mode selection circuit.

5. A computer comprising:
    a central processing complex (CPC) including a central processing unit, a memory and a memory and Input/Output (I/O) controller;
    a data storage device;
    an interface circuitry coupled between said data storage device and said CPC, said interface circuitry including:
        a parallel data line for transferring parallel data between said data storage device and said CPC;
        a multi-mode, parallel/serial data line for selectively transferring parallel or serial data between the data storage device and said CPC;
        a switching circuit, connected to said parallel/serial data line, having first and second selectable modes of operation; and
        a data transfer mode selection circuit connected to said switching circuit, said mode selection circuit for sending a parallel mode selection signal to said switching circuit for placing said switching circuit in said first mode of operation, wherein parallel data is transferable between the storage device and said CPC over both the parallel data line and the parallel/serial data line, said mode selection circuit for sending a serial mode selection signal to said switching circuit for placing said switching circuit in said second mode of operation, wherein serial data is transferable between said storage device and said CPC over said parallel/serial data line, and wherein the interface circuitry is connected to a docking station.

6. The computer of claim 5, wherein the interface circuitry is electrically connected to an Advanced Technology Attachment/Integrated Drive Electronics bus.

7. The computer of claim 5, wherein the data transfer mode selection circuit is electrically connected to the switching circuit through the interface circuitry.

8. The computer of claim 5, wherein the data transfer mode selection circuit is electrically connected to the switching circuit via a conductor, oriented between the computer and the data storage device, that is non-dedicated to the data transfer mode selection circuit.

9. A docking station for use with a computer having a central processing complex (CPC) including a central processing unit, a memory and a memory and Input/Output (I/O) controller; a computer interface circuitry connectable between an external data storage device and said CPC, said computer interface circuitry including a parallel data line for transferring parallel data between said external data storage device and said CPC, a multi-mode, parallel/serial data line for selectively transferring parallel or serial data between said external data storage device and said CPC; a switching circuit, connected to said parallel/serial data line, having first and second selectable modes of operation, said docking station comprising:

a storage device interface connectable to said external data storage device, said storage device interface being connectable to said computer interface circuitry by a plurality of conductors; and a data transfer mode selection circuit connectable to said switching circuit, said data transfer mode selection circuit for sending a parallel mode selection signal to said switching circuit for placing said switching circuit in said mode of operation, wherein parallel data is transferable between said external data storage device and said CPC over both said parallel data line and said parallel/serial data line, said data transfer mode selection circuit for sending a serial mode selection signal to said switching circuit for placing said switching circuit in said second mode of operation, wherein serial data is transferable between said external data storage device and said CPC over said parallel/serial data line, wherein said docking station is capable of interfacing said external data storage device to said computer whether said external data storage device is a serial data storage device or a parallel data storage device.

10. The docking station of claim 9, wherein said computer interface is electrically connected to an Advanced Technology Attachment/Integrated Drive Electronics bus in said computer.

11. The docking station of claim 9, wherein said data transfer mode selection circuit is electrically connected to said switching circuit through said storage device interface.

12. The docking station of claim 9, wherein said parallel data line is electrically connected to a Central Processor Unit-Input/Output (CPU-I/O) interface circuit of said computer via an Advanced Technology Attachment/Integrated Drive Electronics bus.

13. The docking station of claim 9, wherein said serial data line is electrically connected to a Central Processor Unit-Input/Output (CPU-I/O) interface circuit of said computer via an Advanced Technology Attachment/Integrated Drive Electronics bus.

14. The docking station of claim 9, wherein said data transfer mode selection circuit is electrically connected to said switching circuit via a conductor, from said plurality of conductors, that is non-dedicated to said data transfer mode selection circuit.

* * * * *